UNITED STATES PATENT OFFICE.

WILLIAM A. MURRAY, OF COVINGTON, KENTUCKY, ASSIGNOR OF THREE-FOURTHS TO A. L. FRANCE, OF COVINGTON, OHIO, WILLIAM C. FRANCE, OF NEW YORK, N. Y., AND FRANK SPINNING, OF CINCINNATI, OHIO.

PROCESS OF MAKING BUTTER.

SPECIFICATION forming part of Letters Patent No. 335,084, dated January 26, 1886.

Application filed August 5, 1885. Serial No. 173,674. (No specimens.)

*To all whom it may concern:*

Be it known that I, WILLIAM A. MURRAY, a citizen of the United States, residing at Covington, in the county of Kenton and State of Kentucky, have invented certain new and useful Improvements in the Art of Making Butter; and I do hereby declare the following to be a full, clear, and exact description of the invention, such as will enable others skilled in the art to which it appertains to make and use the same.

The object of my invention is to reduce the cost of making butter, and at the same time supply an article which will be as good in flavor, color, and quality as that made from the cream of cow's milk in the ordinary manner; and to this end my invention consists in mixing a quantity of sweet milk with certain flavoring and coagulating matter and churning them together for a few minutes, after which a quantity of butter is added and the churning continued for a few minutes longer. Then it is worked in well or suitable water for a short period of time, and afterward salted and allowed to cool in the usual manner, as will now be described more fully.

To one gallon of sweet milk add one ounce of liquid rennet, twenty-five grains (Troy) of nitrate of potash, one ounce of granulated sugar, one-half tea spoonful of butter-coloring. Put all in a churn and churn for five minutes. Then add eight pounds of butter—such as made from cow's milk—and continue churning for four minutes longer, after which take it out of the churn and work it in well or suitable water for one minute. Then pour off the water and salt it well and set it in a cool place to become firm. Keep it covered with cloth and salt in the usual manner.

The rennet is for coagulating, the potash and sugar for flavoring, the milk and butter for supplying body, and these together with the coloring-matter produce the desired article when worked as hereinbefore described.

It is not absolutely essential that coloring-matter should be added in making butter according to my process; but in order to obviate any prejudice which might arise from lack of healthy color, it is often found desirable to add a suitable amount of ordinary "butter-coloring."

Having thus described my invention, what I claim as new, and wish to secure by Letters Patent, is—

1. An improvement in the art of making butter, which consists in mixing one gallon of sweet milk with one ounce of liquid rennet, twenty-five grains (Troy) of nitrate of potash, one ounce granulated sugar, half tea spoonful of butter-coloring, and eight pounds of butter, churned together and worked, in the manner substantially as described.

2. An improvement in the art of making butter, which consists in mixing with a quantity of sweet milk flavoring and coagulating matter and churning them together for a few minutes, then adding a quantity of ordinary butter almost equal in bulk and churning the whole together for a few minutes longer, in the manner substantially as described.

In testimony whereof I affix my signature in presence of two witnesses.

WILLIAM A. MURRAY.

Witnesses:
J. O'HARA,
C. A. TINLEY.